United States Patent [19]

Masonek et al.

[11] Patent Number: 5,213,180
[45] Date of Patent: May 25, 1993

[54] LUBRICANT APPLICATOR FOR DRIVE CHAIN

[76] Inventors: Steven J. Masonek, 7475 Cana Hwy., Chico, Calif. 95926; Frederick N. Rabo, 2120 Oro-Chico Hwy., Durham, Calif. 95938

[21] Appl. No.: 907,623

[22] Filed: Jul. 2, 1992

[51] Int. Cl.⁵ ............................................. F16N 7/16
[52] U.S. Cl. .................... 184/15.2; 184/15.1; 184/15.3; 474/91; 474/92
[58] Field of Search .............. 184/15.1, 11.5, 15.2, 184/28, 15.3; 474/91, 92

[56] References Cited

U.S. PATENT DOCUMENTS

| | | | |
|---|---|---|---|
| 648,724 | 5/1900 | Cole | 474/92 |
| 648,866 | 5/1900 | Gibford | 474/92 |
| 2,813,599 | 11/1957 | Amberg | 474/91 |
| 4,120,380 | 10/1978 | Mann | 184/28 |
| 4,578,120 | 3/1986 | Chiarella . | |
| 4,593,923 | 6/1986 | Thalmann . | |
| 4,891,037 | 1/1990 | Maples | 184/15.1 |
| 5,020,637 | 6/1991 | Hoenselaar | 184/15.1 |

OTHER PUBLICATIONS

Allsop, Inc., Chain and Freewheel Cleaning/Lubricating System, instruction pamphlet, 1987.

Primary Examiner—Thomas E. Denion

[57] ABSTRACT

A drive chain lubricant applicator comprising an elongated plastic housing having a central chain passageway, and two open ends for ingress and egress of a length of drive chain. The housing is openable with a living hinge so it may be placed around and closed over a drive chain. The interior of the housing is covered with flexible plastic bristles placed to oppose one another and to protrude or extend into the central chain passageway for distributing a lubricant over the drive chain. A flexible length-adjustable cord releasibly secures the lubricator stationary over the drive chain during the application of lubricant. The lubricant is dispensed through a hose from a spray can or squeeze tube and through a hose attachment fitting and distribution manifold on the top of the lubricator and into the interior to be applied to the chain by the plastic bristles as the chain is drawn through the applicator.

1 Claim, 7 Drawing Sheets

5,213,180

LUBRICANT APPLICATOR FOR DRIVE CHAIN

BACKGROUND OF THE INVENTION

1. Field of the Invention

This invention relates to devices for applying lubricants to sprocket drive chains on vehicles such as motorcycles, bicycles and the like.

2. Description of the Prior Art

Sprocket drive chains are comprised of a plurality of small individual links pivotally joined together to form a continuous loop attachable around at least two sprockets. The pivotal joints allow the chain to easily change from a linear to a curved shape for riding over and around the sprockets. The junctions of the chain links are particularly susceptible to binding and wear from friction, and therefore require sufficient lubrication. A significant amount of power may be lost without the drive chain being properly lubricated or free to move.

Most drive chains found on bicycles and motorcycles are generally exposed to the elements where the chain lubricant is adversely effected by sunlight, water and dirt, and must be frequently replenished, especially with off-road motorcycles and mountain bicycles. In the past, one method of thorough lubrication of the chain, which was a messy and time consuming job, required the removal of the chain from the motorcycle or bicycle where it could be immersed in a cleaning and lubricating solvent or lubricating oil.

Various other drive chain cleaning and lubrication methods and devices have since been introduced which can be applied with the chain still on the vehicle sprockets. A disadvantage of many of the prior art fluid lubricant applicators is that they are structured specifically for use with fluid lubricants such as liquid oils, and are not structured to be used with modern lubricants which may be purchased in hand-held spray cans or squeeze tubes or cans. Many of these modern lubricants contain state-of-the-art lubrications having silicone bases, and which are preferred by many individuals. Suitable lubricants for drive chains are not limited to liquids, but today also include spray-on lubricating foams. One of the more popular types of chain lubricants currently on the market is a silicone based spray foam lubricant which cannot be effectively used with the majority of existing attachable chain cleaners and lubricators.

Another major disadvantage of the majority of the existing lubricant applicators includes the apparent high cost of manufacture due to large numbers of parts to be made and assembled. These applicators are comprised of many intricate parts which must be assembled prior to use, which significantly increases the labor and thus manufacturing costs.

Some of the prior art drive chain lubricant applicators rely on oil reservoirs which the chain is directed through, and the reservoirs serve as solvent or oil baths, resulting in the use and contamination of much more oil than is actually needed to lubricate the chain.

Of the prior art drive chain lubricant applicators of which we are aware and consider relevant to our invention, the following typify the structures, methods of use, and the problems associated therewith: A U.S. Pat. No. 4,593,923, issued to Thalmann Jun. 10, 1986, discloses a bicycle sprocket chain cleaner which attaches over the drive chain. The device contains a reservoir of fluid cleaning solvent which could be substituted with a liquid lubricant. The liquid solvent or lubricant could be easily spilled with all the manipulating that is required to attach and remove the device. The reservoir is not suited for dispensing a foam lubricant, therefore limiting its use. The attachment structure for securing the Thalmann device in a stable position on the chain is also not adequately adjustable and is therefore not readily adaptable to a wide variety of models of bicycles and motorcycles. It also appears the Thalmann device is expensive to manufacture since it is comprised of many separate parts which must be manufactured and assembled. The Thalmann device is not structured for utilizing a spray liquid or foam lubricant directly dispensed from a hand-held container.

Chiarella was granted U.S. Pat. No. 4,578,120 on Mar. 25, 1986 for a bicycle chain cleaning device and method. The Chiarella device also utilizes fluid lubricants or cleaning solvents, and does not appear capable to allowing the user to utilizes a hand-held spray type lubricant such as a silicone based foam. This device also appears to be comprised of many intricate parts which require assembly, and therefore increase unit cost.

The spraying of lubricants directly onto a drive chain is another process used by many, but it is difficult to get the lubricant onto the back or far side of the chain which is adjacent the bike or motorcycle, and additionally this process results in un-sightly and dirt collecting over-spray of the lubricant onto the frame and wheels.

SUMMARY OF THE INVENTION

The present invention may take numerous structural forms all falling within the scope of the invention as depicted in the appended claims, however several detailed structural embodiments will be described and shown in the drawings in order to illustrate the invention by way of example, with these examples not to be considered to be the only structures which meet the objects and provide the benefits of the present invention. The invention of this disclosure is a chain lubricant applicator structured with the intent to solve many of the problems associated with the prior art devices. Our lubricant applicator is readily attachable to be utilized for applying lubricant to a drive chain of a motorcycle or bicycle or the like, and is readily detachable for easy removal after the chain has been lubricated. One of the major objects and advantages of this invention includes unique structuring which, utilizing modern plastic injection molding techniques, allows the production of a simple, easy to use, highly effective, and inexpensive lubricant applicator for use with drive chain. By greatly simplifying the structure and reducing labor intensive assembly time of the chain lubricant applicator to a minimum, manufacturing costs are greatly reduced. The present invention is intended to be utilized in conjunction with small lightweight containers of lubricant of the types which may be held in one hand, and normally contain 3 to 16 fluid ounces of lubricant. These small lubricant containers are readily available in pressurized spray or pump types, and squeeze types which include facilities for connecting small straw-like tubes to the dispensing apertures. These hand-holdable containers are available with a variety of different lubricating materials such as liquids and foams whether petroleum or silicone based. Powdered lubricants are also available on the market.

In a first embodiment of our lubricant applicator, a plastic housing of polyethylene or any other suitable plastic not subject to breakdown by lubricants, is defined by three panels and a door panel, and is made with integrally molded plastic bristles utilizing modern plastic injection molding techniques. The highly flexible and somewhat resilient bristles function to distribute or work the lubricant over most if not all exposed surfaces of the chain. With this embodiment, the integral molding eliminates the need to affix the bristles later, which could add to the assembly time and manufacturing costs. The housing and bristles are initially manufactured as a substantially flat rectangular main panel. The housing is optimally about 3 inches in length, but of course could be sized differently for different sized chains, although a given size housing should be able to be used with several drive chain sizes falling within a close range with one another. The rectangular main panel additionally includes a hose attachment fitting and lubricant distribution manifold for use with a hand-held container of lubricant, and further includes three integrally molded living hinges. The living hinges divide the main panel into four connected sub-panels, with one sub-panel being the door panel. The living hinges allow the flat molded main panel having the integrally molded bristles to be folded into an elongated open ended box-like housing sized to be wrapped around a chain with the bristles positioned within the interior of the housing, and one of the living hinges serves as a hinge to the door panel to allow the housing to be opened and wrapped around the chain. Two shape-retention clip members, which may be molded of plastics separate from the main panel with bristles, are structured for attachment over three of the sub-panels of the folded housing excluding the door panel, to maintain the rectangular box-like formation. The housing door panel can be secured in a closed position with a snap or interference latch or the like which is preferably also integrally molded with the main panel and bristles for economic reasons.

The flat main panel with bristles and the other integrally molded components are structured to allow the applicator to be molded flat in a manner which results in being able to utilize conventional and relatively inexpensive plastic injection mold tooling to further help maintain the production cost of this embodiment of our invention low.

A flexible, length-adjustable cord is attached to one of the shape-retention clip members located at one end of the rectangular housing, and a loop is provided in a distal end or portion of the cord for looping around a stationary member of the bike or motorcycle for stabilizing our lubricant applicator on the chain during use in applying lubricant.

A plastic housing or main body of a second embodiment of our lubricant applicator is defined by two curved main body members connected together by a single lengthwise living hinge. This second embodiment offers essentially the same benefits to the user as the first embodiment, and may also be manufactured at a relatively low cost using modern manufacturing techniques such as plastic injection molding and with minimal assembly required.

Our chain lubricant applicator in accordance with the present invention is extremely easy to use, that is, attach to a drive chain, apply lubrication, and then remove the lubricant applicator. The housing is simply fitted over the drive chain and snapped closed, with the attachment cord looped over some stable portion of the vehicle such as the foot rest of a motorcycle, or the spindle end adjacent a crank arm of the pedal assembly of a bicycle.

Since many motorcycles and bikes vary in structure and size, the length adjustable attachment cord makes application easy, since the cord is not only adjustable in length, but is also flexible and can be drawn over, under, or around obstructions. Since the attachment cord eliminates the need of the user to hold the applicator during use, the user can rotate the wheel of the bike or motorcycle with one hand, the motorcycle or bike preferably being first supported by a stand, and operate the lubricant container with the other hand. With rotation of the wheel or more importantly the chain in the proper direction, the chain is drawn through the applicator housing in the direction which pulls the attachment cord tight when it reaches its maximum extension, and thus the applicator housing is stabilized. The lubricant is forced through the distribution manifold of the applicator, and into the top interior of the applicator and into a chain passageway. The length and pliability of the bristles which extend into the chain passageway of our applicator help to distribute and work the lubricant evenly over most if not all exposed surfaces of the chain as the chain passes through the stationary housing of the lubricator. Since the pivotal joints of a drive chain are located on the lateral edges or two oppositely disposed sides of the chain, our distribution manifold is preferably structured with two space openings directly above the chain passageway so that most of the lubricant is first deposited onto the edgeward pivot points of the drive chain. The distribution manifold enters the interior of the housing toward one end of the chain passageway, so that when the lubricant is applied to a drive chain being drawn in the proper direction through the stabilized housing, a greater number of bristles have worked the lubricant into the chain before the chain exists the housing than would have if the lubricant entered the center of the housing. Although the distribution manifold enters the interior of the housing toward one end of the chain passageway or housing, a plurality of several rows of bristles are left between the adjacent end of the housing and the entrance of the distribution manifold, and this allows for the bristles to essentially serve as a self-adjusting closed door wherein the chain and the bristles essentially close this open and and generally prevent lubricant from escaping from that end whether the lubricant is liquid, foam, or vaporous liquid. The end of the housing nearest the distribution manifold and the attachment cord is the open end of the housing through which the chain when being drawn in the proper direction enters the housing of our applicator.

The housing of our invention when closed around a chain is generally closed on all sides except the two open ends, and the open ends are essentially closed by the plurality of rather densely placed flexible bristles, coupled with the distribution manifold depositing lubricant inward of the adjacent housing end, and this provides for a rather effective containment of lubricant to greatly reduce over-spray. This of course relies in part on the user visually watching the amount of lubricant on the exiting chain so he does not apply an excessive amount of lubricant.

Since the lubricant applicator of this invention may utilizes spray foam, oils or even possibly powdered fluid lubricants, it provides a wider range of choices for the user over the prior art devices. Additionally, our invention for use with squeeze or spray-on lubricants helps reduce the amount of wasted lubricant by allowing the use of the needed amount without waste or contamination of un-used lubricant such as with an oil bath arrangement.

Therefore, a major object of the invention, as previously stated, is to provide an improved chain lubricant applicator which is highly effective, and which is structured for manufacture utilizing modern plastic injection molding processes with minimal assembly required, to provide the applicator at a significantly low cost.

Another object of the invention is to provide the above in a chain lubricant applicator which is adapted to dispense many types of fluid lubricants, including oils and foams from a hand-held squeeze or spray can or tube.

Another object of the invention is to provide the above in a chain lubricant applicator which may be quickly and easily placed on the chain while the chain remains on the vehicle sprockets, and which also contains lubricant over-spray to help keep the vehicle clean.

A further object of the invention is to provide the above in a chain lubricant applicator which is structured for temporary usage, and therefore will not be permanently mounted to the motorcycle or bike. Thus, bolt hole damage to the frame is eliminated as well as the excess weight of a permanent applicator which may be undesirable to motorcycle or bicycle racers.

A further object the invention is to provide the above in a chain lubricant applicator which applies the lubricant to most if not all exposed surfaces of the chain.

These and many other objects and advantages of the present invention will become more apparent from reading the remaining specification with a comparison of the numbered drawings provided for example.

DESCRIPTION OF THE PREFERRED EMBODIMENTS

Figure 1:
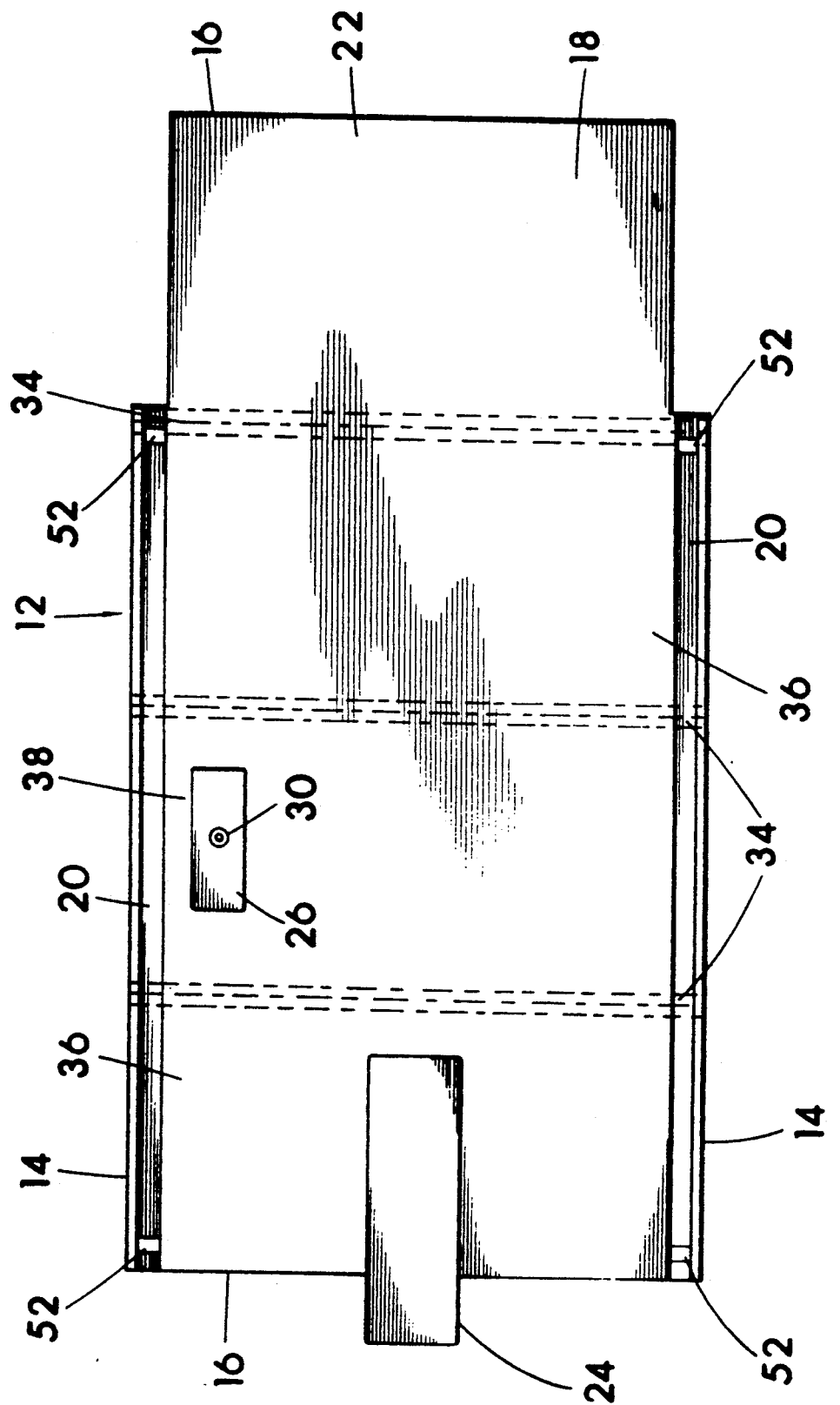
FIG. 1 is a top plan view of the generally flat rectangular main panel of our first embodiment in accordance with the present invention prior to folding to form the open ended rectangular housing.
Figure 2:
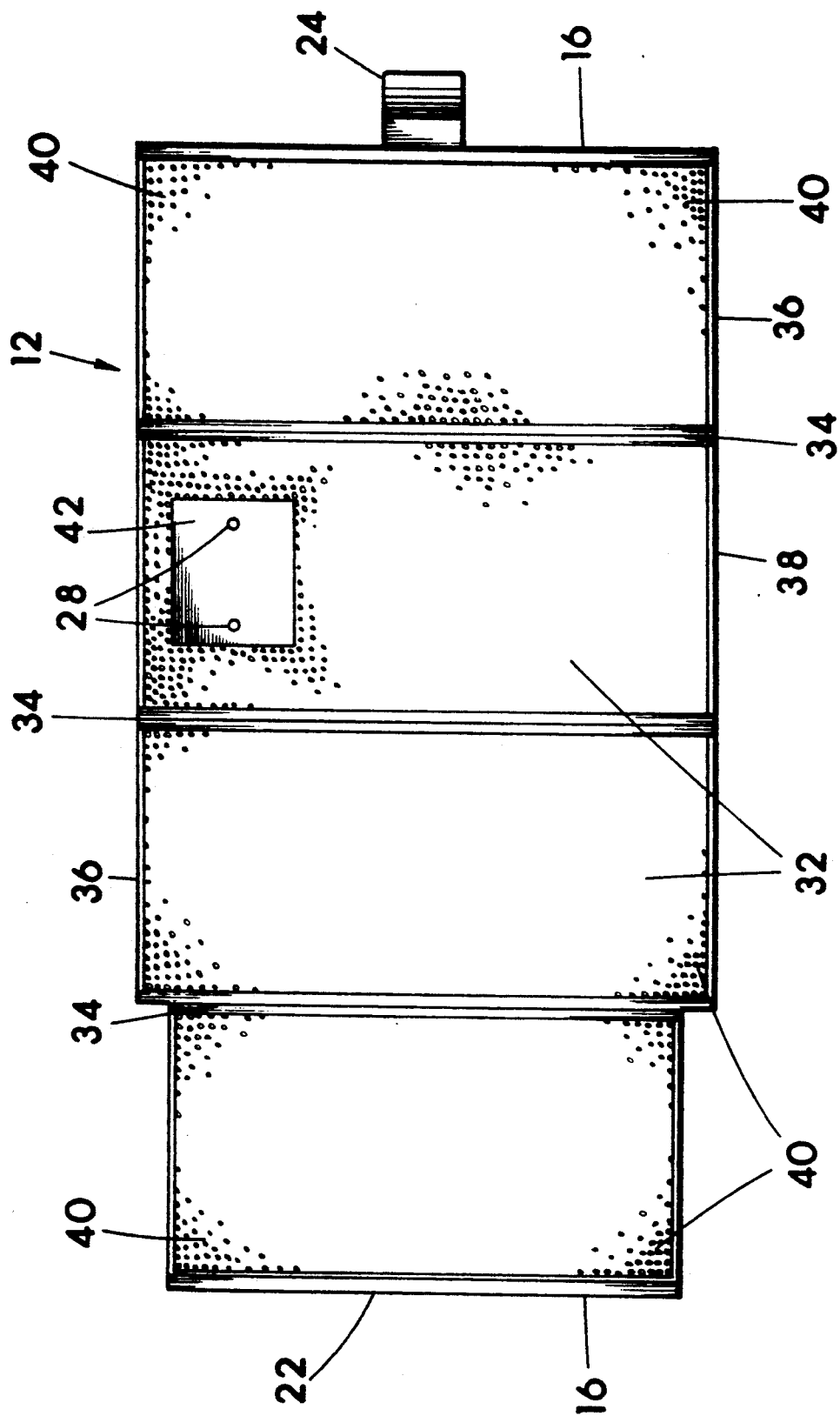
FIG. 2 is a bottom plan view of that shown in FIG. 1, with this being the side with the bristles.

Referring now to the drawings where our chain lubricant applicator is illustrated in various structural embodiments in accordance with the present invention. FIG. 1 is a top plan view of the generally flat rectangular main panel 12 of our first embodiment 10 prior to folding to form the open ended rectangular housing. FIG. 2 shows the oppositely disposed side of that shown in FIG. 1. The main panel 12 of applicator 10 is initially manufactured as a single, flat rectangular solid material plastic panel 12, as shown in FIGS. 1 and 2. Panel 12 is comprised of two lengthwise lateral edges 14 and two shorter panel ends 16. The exterior surface 18 of panel 12 contains two linear grooves 20 running about three fourths the distance of the lengthwise sides adjacent each lateral edge 14 (see FIG. 1). The material surrounding or defining grooves 20 does not extend the full distance of lateral edges 14 creating slight insets in the remainder of panel 12, thus making one panel end 16 narrower than the other. This narrower panel end 16 is designated door 22. Attached on the exterior surface 18 of panel 12 is latch 24. Latch 24 is located on the central edge of door 22, and is an elongated rectangular raised area of panel 12 which extends a short distance past the edge of door 22. The extending free end of latch 24 forms a beveled or sloped ledge adapted to allow the closing door 22 to press the latch outward whereby the door moves beyond the latch into the closed position and the latch spring back over the door edge whereat a flat section of the latch maintains the door 22 in the closed position until the latch 22 is manually pushed outward again to allow opening of the door 22. A desirable degree of flexibility and resiliency are provided in latch 24 by most any thermoplastic material such as polyethylene, and this allows the latch to serve as an interference or snap latch in cooperation with door 22. Other door latching devices could of course be used to temporarily maintain the door 22 closed when desired. Also located on exterior surface 18, adjacent one groove 20, is a small rectangular raised area referred to as support 26. Support 26 is a thickened area of panel 12 providing sufficient material thickness for the angled tubular fluid distribution manifold 28. Distribution manifold 28 communicates with a hollow tubular hose connector stem 30 which projects perpendicularly from the central surface of support 26 (see FIG. 4). The hollow angled portions of distribution manifold 28 may be made by using two retractable core pins in the plastic injection mold tool as those skilled in the art will recognize. Tubular hose connector stem 30 as shown in FIG. 4 is for the frictional engagement of a flexible hose over the stem 30.

The interior surface 32 of panel 12, as shown in FIG. 2, has three living hinges 34 created by shallow V-shaped impressions running across panel 12. In FIG. 1, the living hinges 34 are indicated with dotted lines since normally if the hinges 34 are on surface 32, the hinges would not show on surface 18. It should be noted the living hinges 34 could be placed on either surface 18 or 32. Living hinges 34 divide panel 12 into four connected relatively equal sections; two side panels 36, top panel 38, and door 22. One side panel 36 is located adjacent door 22, followed next with top panel 38, and finally the second side panel 36 which has latch 24. Covering generally the entire surface of interior surface 32, except over living hinges 34, are a multiple of integrally molded bristles 40. A small rectangular area also not covered with bristles 40, is referred to as lubricant distribution chamber 42. Chamber 42 is located on interior surface 32 of panel top 38, directly opposite to support 26 located on exterior surface 18. The two spaced apart dispensing apertures of distribution manifold 28 both open into distribution chamber 42 spaced so the lubricant is first freely deposited on the two oppositely disposed side edges of the drive chain 62 to be worked into the properly moving chain 62 by the large number (majority) of bristles 40 positioned downstream through which the chain will be drawn.

Figure 3:
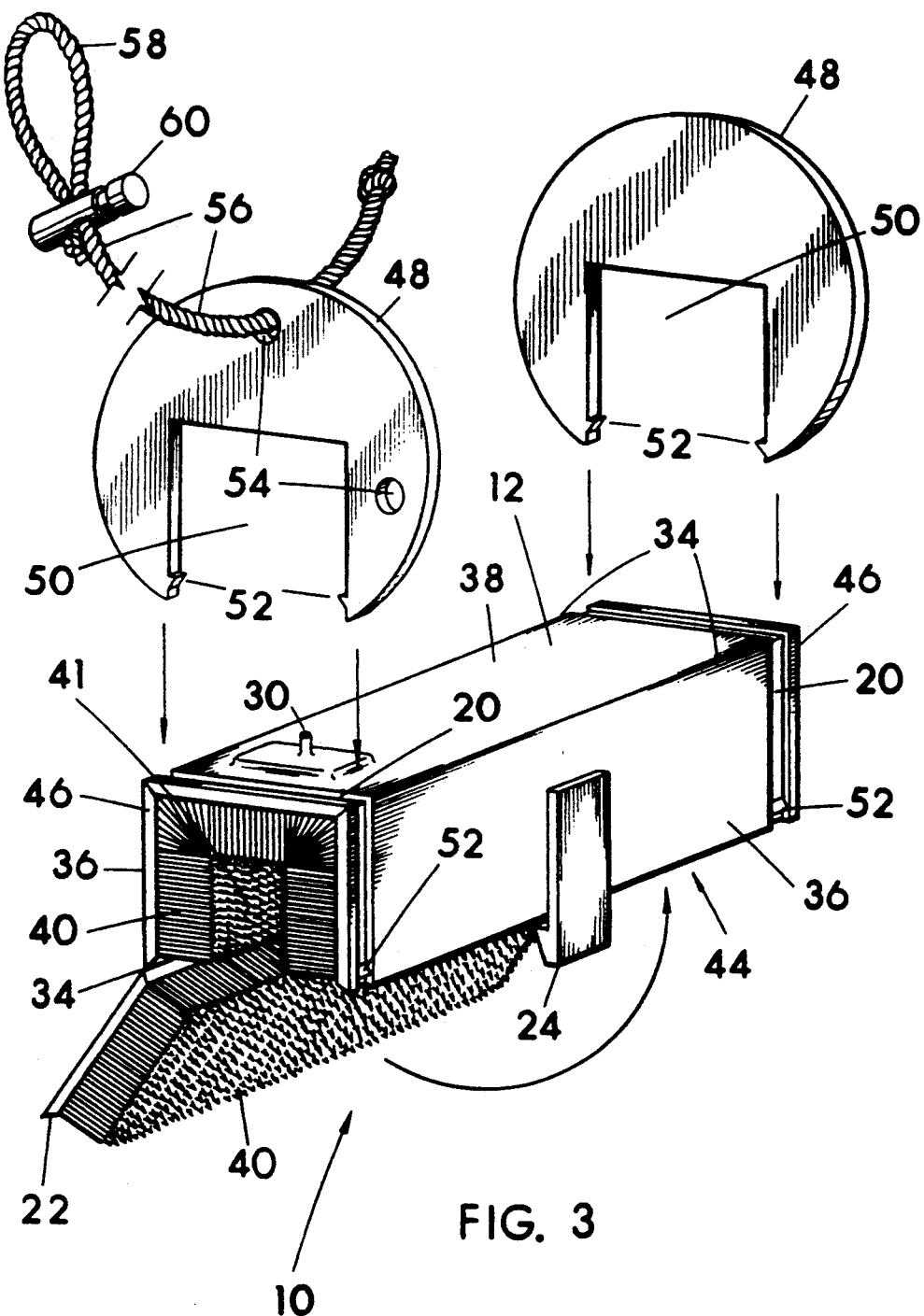
FIG. 3 is a partially exploded perspective view of the component parts of the first embodiment applicator positioned for assembly.
Figure 4:
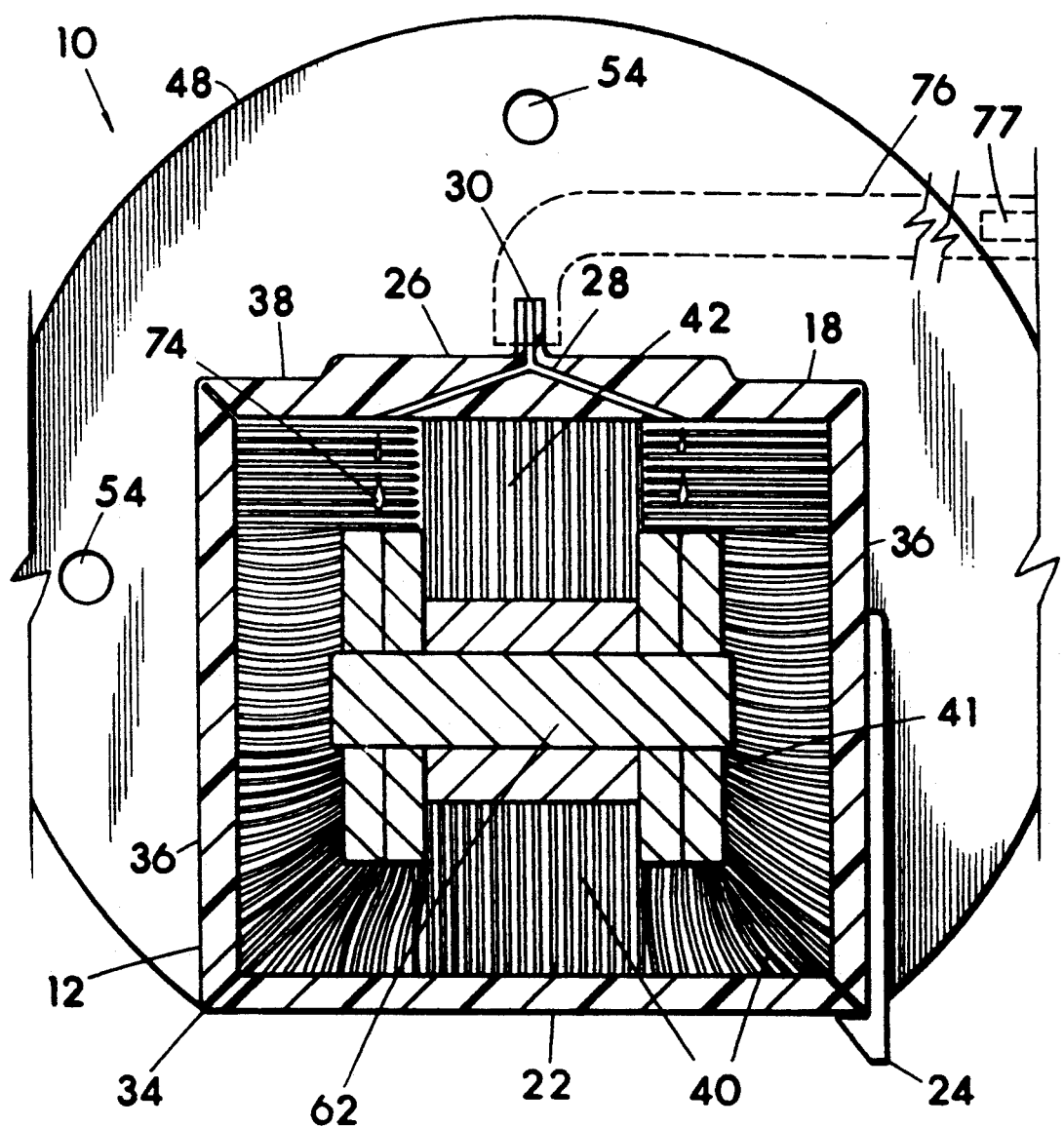
FIG. 4 is a cross section of the rectangular housing of the first embodiment showing the internal bristles contacting the exposed surfaces of the chain positioned within the chain passageway.

To assemble panel 12 into chain lubricant applicator 10 into a box-like structure, panel 12 is folded along living hinges 34 toward interior surface 32, to form a rectangular housing 44 wherein bristles 40 are positioned within the interior of the housing 44 opposing or aiming toward one another and defining a central chain passageway 41 as shown in FIG. 3 and 4. The lateral edges 14 of panel 12 now form housing ends 46. To maintain housing 44 in this folded rectangular position, two shape-retention clips 48 are inserted in grooves 20 on each housing end 46. The shape-retention clips 48 are roughly flat plates preferably made of plastic and having a rectangular notch 50 formed into one edge which is sized and structured for insertion over each of the oppositely disposed open housing end 46 within grooves 20. The lower interior edges of rectangular notch 50, close to the opening of the notch 50 as shown in FIG. 3 on each clip 48 also has an integrally molded wedge 52, shown in FIG. 3. Wedge 52 interlocks or snaps over a similar but reversed wedge 52 affixed (integrally molded) within the terminal ends of each groove 20. The wedges 52 are structured with slope or angle planes positioned to ramp over one another, and are further structured with flat or evenly slightly undercut planes which engage or abut one another to serve as a snap lock. Flexibility and resiliency to allow for the ramping over and snapping together of wedges 52 to serve as locks are of course necessary and provided with most any of the modern thermoplastics which might be used to make main panel 12 and shape-retention clips 48. Shape-retention clips 48 are shown in the drawings being somewhat round or absent sharp corners, and this is simply to reduce the possibility of corners catching or hanging-up on parts of the motorcycle or bike during installation and removal of the applicator, thus rending the applicator more convenient to use. Additionally, shape-retention clips 48 are shown extending outward beyond side panels 36 and top panel. The enlarged size of the forward clip 48 which receives cord 56 for being able to attach and support cord 56 upward away from chain passageway 41 so it doesn't get initially drawn in by the moving chain before the cord 56 becomes taunt, and the shape-retention clip 48 at the opposite end of the applicator from the clip 48 is enlarged so that in the event the cord 56 is not initially adjusted to the proper length and is set too long, if the chain is rotated and the applicator moves with the chain too far, the applicator will be less likely to be crushed or damaged between the chain and the rear sprocket as may be ascertained by looking at FIG. 5. Other structures could of course be used to retain main panel 12 in its rectangular shape, and clips 48 could be glued in place if desired, since the clips 48 need not be removed after initial assembly.

An aperture 54 is located on the clip 48 which is positioned adjacent hose connector stem 30. Aperture 54 is positioned on the central upper edge of clip 48, with a second optional attachment aperture 54 being provided on the side of clip 48 if desired. Attachment aperture 54 is used for attachment of the flexible cord 56, which is simply an elongated nylon or cotton string having an adjustable loop 58 incorporated into the opposite end thereof. We have considered and will further explore the possibility of injection molding the cord 56 as a thin and flexible band or cord of plastic molded integrally onto clip 48 or directly onto panel 12, and this might also apply to the second and third embodiments of our invention which have not yet been detailed.

A releasable slip fitting 60 is affixed to a distal portion or end of cord 56 whereat the free end of the cord 56 is doubled back through the fitting 60 to define a loop 58 for hooking over some stable portion of the vehicle such as the foot rest of a motorcycle, or the spindle end adjacent a crank arm of the pedal assembly of a bicycle. The particular releasable slip fitting 60 shown in FIG. 3 is but one of many commercially available fittings which could be used, and which are often found used in the apparel and camping gear industries. Such fittings as fitting 60 normally include an internal spring biased arrangement which pinches or binds the two cord portions together against one another in a stable relationship with frictional adhesion until such time the release button of the fitting is pressed to defeat the spring tension and allow the slipping of either portion of the cord 56 through the fitting 60 which results in being able to effectively adjust the length of the cord 56, and if desired, the size of the loop 58. Other fittings could be used as substitutes for fitting 60, and such fitting are much more convenient than the tying of knots which would actually work.

Figure 5:
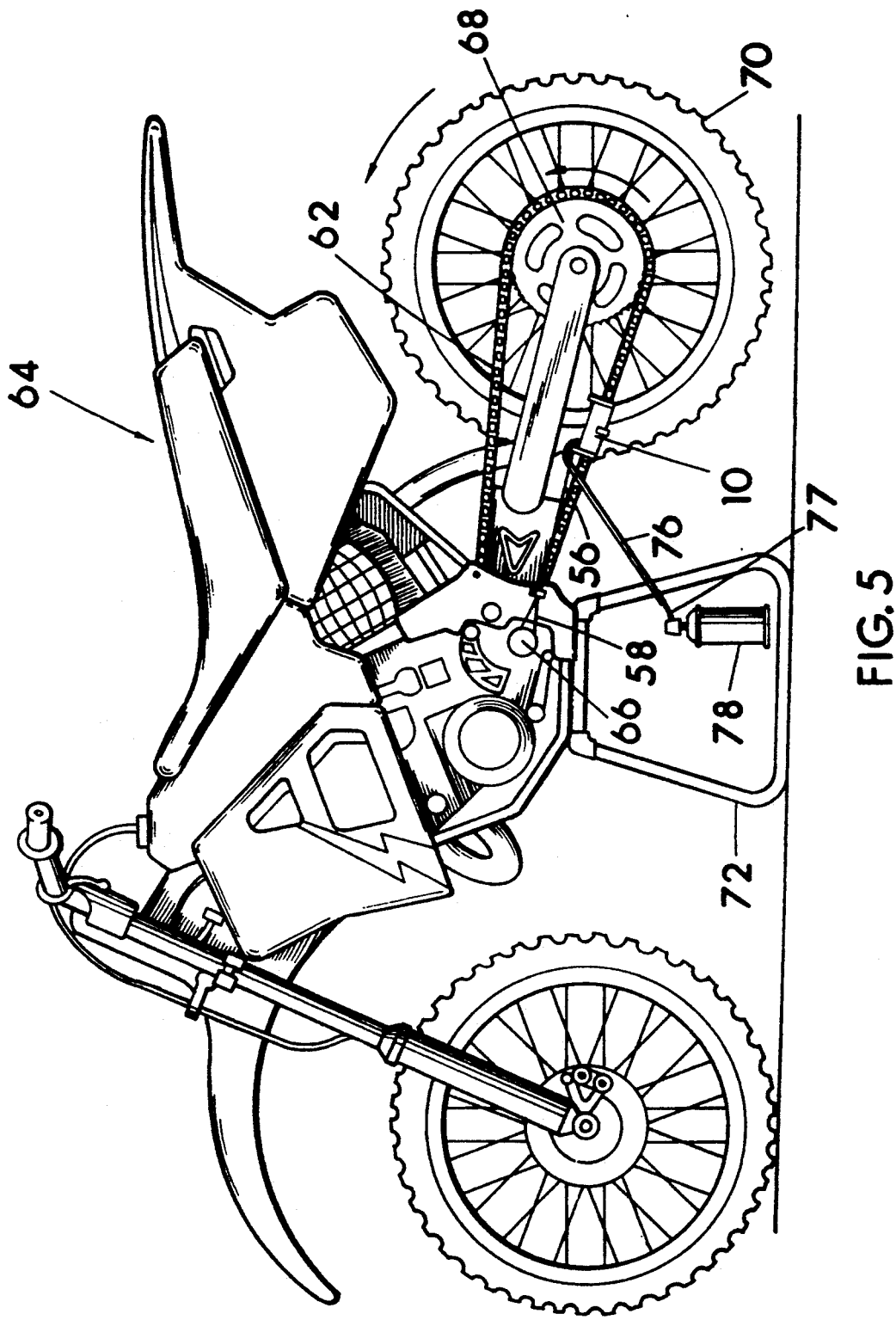
FIG. 5 is an in-use view of our applicator in accordance with the present invention applied to a motorcycle chain for example. The flexible cord is shown looped around the foot rest in order to stabilize the applicator relative to the vehicle frame, and a handholdable container of lubricant is shown attached by a elongated flexible hose to the applicator.

In one method of connecting chain lubricant applicator 10 onto drive chain 62 of a motorcycle 64, as shown in FIG. 5 and being essentially the same with a bicycle, housing 44 is positioned parallel over drive chain 62 with panel top 38 positioned upwards and door 22 opened. Chain lubricant applicator 10 should be positioned so that drive chain 62 will be passing first through the open housing end 46 which is adjacent the clip 48 having attachment cord 56. Housing 44 is then pressed over drive chain 62, with bristles 40 fitting snugly over and between the links of chain 62. Door 22 is then snapped closed. Attachment cord 56 is then drawn to the left of chain lubricant applicator 10, as shown in FIG. 5, preferably generally parallel to drive chain 62 to prevent racking or rolling of housing 44 during use. The second attachment aperture 54, located on the side of clip 48, is available if desired to provide a more parallel alignment of attachment cord 56 and chain 62. Adjustable loop 58 is then fitted over a stationary or stable member of motorcycle 64, such as a foot rest 66, and slip fitting 60 adjusted to eliminate slack in cord 56. The length of attachment cord 56 should be such that chain lubricant applicator 10 is not drawn into sprocket 68 as chain 62 rotates counterclockwise. Motorcycle 64 is then positioned so that rear wheel 70 rotates freely, preferably with the use of a support stand 72 to raise the rear wheel off of the ground. To dispense a spray lubricant 74 from chain lubricant applicator 10, an elongated flexible and elastic tube or hose 76 is attached over hose connector stem 30 with the opposite end of hose 76 affixed over a small dispensing straw 77 attached to the dispensing nozzle of the spray lubricant container 78. The small dispensing straw 77 is normally provided with the lubricant container 78, but is too short and rigid normally to connect directly to applicator 10, and therefore hose 76 is used as a more flexible extension to straw 77. The user can rotate rear wheel 70 with one hand and hold and operate spray lubricant container 78 with the other hand (not shown). The lubricant 74 is dispensed through flexible hose 76, to hose connector stem 30 and eventually out the two spaced apart dispensing apertures of distribution manifold 28. The open area of lubricant distribution chamber 42 allows lubricant 74 to flow freely onto chain 62. Lubricant 74 flows downward and is drawn to the right in FIG. 5 as chain 62 rotates, thus redistributing lubricant 74 onto other bristles 40. As more bristles 40 become coated with lubricant 74, they in turn transfer lubricant 74 to various areas of chain 62 including the inner surfaces between the links. Excess dirt is also scraped from chain 62 by bristles 40. When sufficient lubricant 74 is applied to chain 62, as detected by visual inspection, chain lubricant applicator 10 is removed by opening door 22, lifting housing 44 from around chain 62, and removing loop 58 from foot rest 66. Although not as easy as the first method of applying lubricant 74, the user could also sit on motorcycle 64 while hold spray lubricant container 78 with one hand and slowly walking or driving motorcycle 64 to rotate chain 62.

The user has a large degree of control of the amount and rate of dispersal of lubricant 74 with the present invention. Should the user wish to use a fluid oil lubricant 74, the same method of application would still be used, except the spray lubricant container 78 would be replaced with a squeeze bottle or a manual pump type dispenser. A powdered lubricant 74 could also be dispensed under the right conditions from a squeeze bottle or an aerosol canister. Actually, any lubricant 74 is suitable for use with chain lubricant applicator 10 if it is readily flowable such as fluids and some powders, or if it can be dispensed under pressure like lubricating foam.

By originally forming housing 44 in one single flat rectangular panel 12, assembly costs of affixing panel sides 36, panel top 38 and door 22 have been eliminated, saving time and money. Additional costs are also saved by integrally molding bristles 40 with or on interior surface 32 of panel 12. Clips 48 can be affixed over housing ends 46 quickly and easily without the use of pins, bolts, or adhesives which again saves money and time. Cord 56 is a very inexpensive member of chain lubricant applicator 10 and can simply be included in the packaging of the device for later assembly onto attachment apertures 54 by the user. The possible cost savings to the consumer purchasing the chain lubricant applicator 10 constitutes a significant improvement in the art. The structural modifications of the invention have also provided added benefits over the past art in the field of ease of use and utilization of various lubrication mediums.

Figure 6:
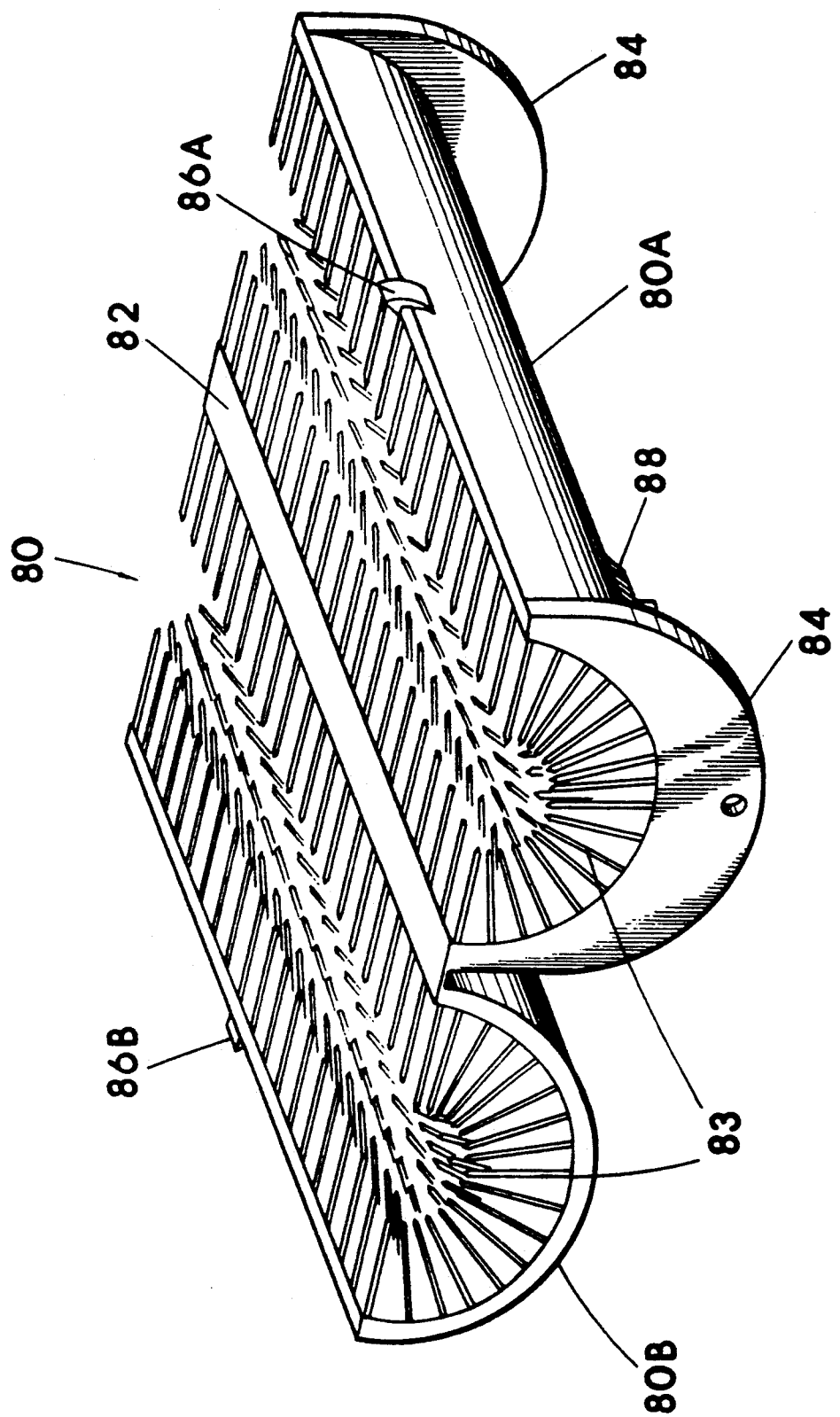
FIG. 6 is a perspective view of the second embodiment of the present invention with the housing shown in the open position. This embodiment is made generally entirely of integrally molded (one piece) plastics.
Figure 7:
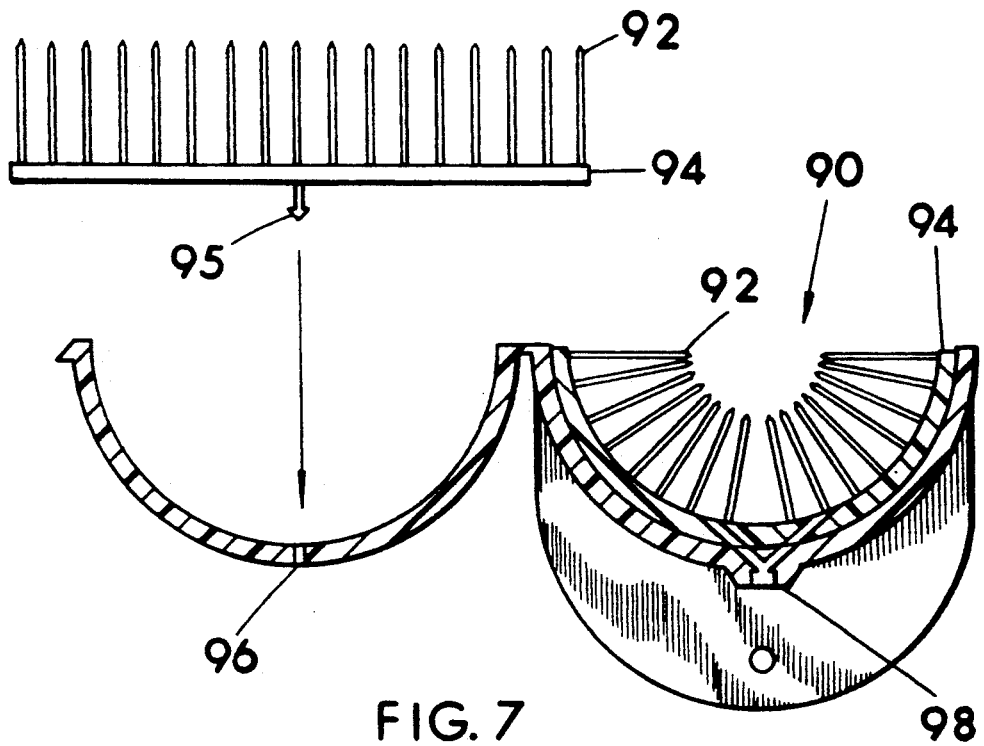
FIG. 7 is a cross-sectional end view of a third embodiment of the present invention, which is quite similar to the second embodiment with the primary exception being that the bristles are manufactured as an attachable unit to be affixed to the housing sections.
Figure 8:
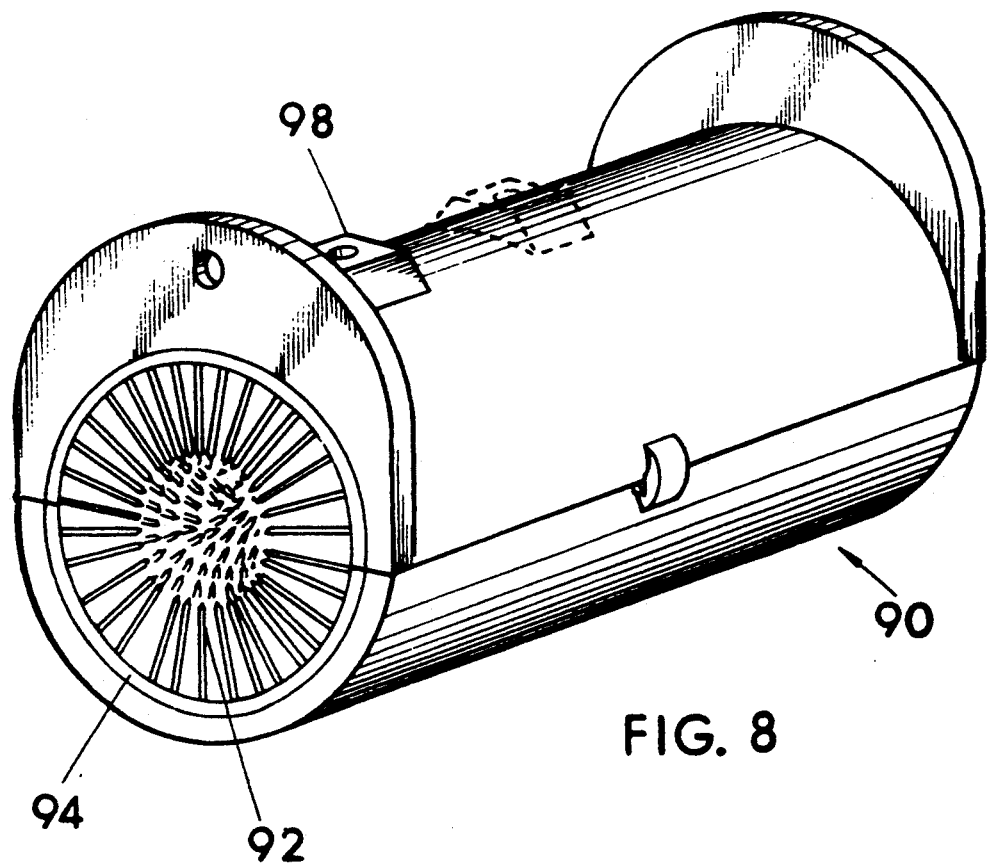
FIG. 8 is a perspective view of the assembled and closed third embodiment.

In order to exemplify that the present invention may take other structural forms within the scope of the invention, a second embodiment is shown in FIG. 6, and a similar third embodiment is shown in FIG. 7 and 8 with both the second and third embodiments having many structural, functional, and use techniques similar to first embodiment 10, and therefor are considered to further define the present invention as depicted in the appended claims.

Referring now to the second embodiment 80 shown in FIG. 6 is a perspective view, with the housing shown in the open position. Embodiment 80 is made generally entirely of integrally molded (one piece) plastics such as polyethylene or propylene, and comprises two half-round main body sections 80A and 80B connected together lengthwise with a single living hinge 82. The two half-round body sections 80A and 80B when folded together with the living hinge 82 form a round tubular housing generally appearing as the third embodiment shown in FIG. 8. Embodiment 80 also includes bristles 83 integrally molded with the curved body panels 80A and 80B; endward placed and outwardly extending plates 84 integrally molded as part of body half 80A; a latching component shown as comprising two cooperative members 86A and 86B to maintain the housing closed as desired; and a hose attachment fitting and distribution manifold 88 similar to that of embodiment 10 for connecting the hose on a small lubricant container for applying lubricant into the center chain passageway of embodiment 80. Embodiment 80 may use an attached length adjustable cord like that of embodiment 10, or may be made with an integrally molded flexible plastic cord shot directly onto the housing body. A cord fitting may also be used to form a loop in the attachment cord and to provide length adjustability. Admittedly, the bristles 83 of embodiment 80 to be integrally molded will require a rather complicated plastic injection mold tool using multiple slides and pins to define cavities in which to integrally form the bristles as part the housing halves 80A and 80B, but the reduced labor by not having assemble components may warrant such a molding tool.

Referring now to FIGS. 7 and 8 where the third structural embodiment of the present invention is shown and generally designated embodiment 90. Embodiment 90 is essentially the same as embodiment 80 with the primary exception that the bristles 92 are integrally formed on flat but flexible plastic backing panels 94 separate from the two curved body halves in order to reduce or eliminate undercuts in the mold which cause problems in removing a plastic part from the mold. The integral molding of the bristles 92 on the flat flexible backing panels 94 is to reduce the cost of the plastic injection mold tooling. The flexible backing panels 94 may include push-pin connectors 95 for inserting into apertures 96 in each body half, and thereby backing panels 94 with bristles 92 may be affixed in the interior and assume the shape of the body halves as may be ascertained from the right side body half in FIG. 7 and from FIG. 8. Glue or sonic bonding could also be used to attach the backing panels 94 in the body halves.

In FIG. 8, third embodiment 90 is shown in the closed position as it would be around a drive chain. Additionally, a dot line drawing of the hose attachment fitting is shown on the top of the housing to show that the hose attachment fitting could be placed in the center of the applicator, and a hose fitting 98 is also shown in solid lines in the preferred off center placement as previously described. The particular hose fitting 98 is of a type in which the end of the hose 76, which at the other is connected directly or indirectly to a lubricant container, is inserted inside a shallow recess in fitting 98 where it is frictionally engaged as opposed to being placed over the stem 30 of embodiment 10. Hose fitting 98 shown best in the cross section of FIG. 7 includes a hollow tubular portion with a distribution tube arrangement similar to that of embodiment 10, with the distribution tubes being aligned with two spaced apertures through the backing panel 94 so that lubricant may enter into the chain passageway and be first deposited onto the two oppositely disposed sides of the drive chain.

Although we have very specifically described some various structures of the present invention, it should be understood that the specific details are given for example only, and are certainly not an exhaustive detailing of all of the structures which we believe are within the scope of the present invention as depicted in our appended claims.

What we claim as our invention is:

1. An applicator for applying lubricant from a hand-holdable container of lubricant through a hose connecting the container of lubricant to said applicator and onto a drive chain, said applicator structured to be temporarily placed around a portion of drive chain on a vehicle and to allow the drive chain to be drawn through said applicator during application of the lubricant, said applicator comprising, a main panel having a first surface and an oppositely disposed second surface, said main panel divided into a plurality of connected sub-panels by a plurality of living hinges, said second surface of said main panel having a plurality of extending flexible bristles for distributing and working said lubricant into a drive chain, said main panel inclusive of said living hinges and said bristles formed of plastics and molded integrally with one another, said main panel foldable along said living hinges into an elongated housing to define a chain passageway having two open ends oppositely disposed from one another to allow the placement of said elongated housing around a drive chain with the drive chain passing through said two open ends, said living hinges being structured so as to allow for the folding of said main panel in a manner as to position said bristles within the interior of said elongated housing with said bristles extending into said chain passageway, shape retention means for maintaining said main panel folded into said elongated housing, at least one of said sub-panels structured to serve as an openable door panel so as to allow the placement of said elongated housing around said drive chain, a latching means cooperative with said door for releasibly maintaining said door in a closed position, a tubular hose connective means on said first surface of said main panel for allowing connection of a hose from a container of lubricant, tubular passageway means communicating with said tubular hose connective means through said main panel to said second surface of said main panel and into the interior of said elongated housing for directing lubricant into said chain passageway, said tubular passageway means including two spaced apart dispensing apertures positioned so as to be able to dispense lubricant onto two oppositely disposed side edges of said drive chain so as to provide means for applying lubricant primarily on pivotal connections located on oppositely disposed side edges of the drive chain, said tubular hose connective means inclusive of said tubular passageway means and said two spaced apart dispensing apertures positioned lengthwise off-center of said elongated housing so as to position said two spaced apart dispensing apertures closer to a first of said two open ends so as to provide means allowing for applying lubricant onto said drive chain and having a substantially increased number of bristles work the lubricant into the drive chain prior to the drive chain exiting said chain passageway as the drive chain is drawn through said chain passageway, stabilizing means, said stabilizing means connected at one end thereof to said applicator, said stabilizing means including means for readily attaching and detaching a distal portion thereof to a stable member of a vehicle for stabilizing said applicator during use on said drive chain of the vehicle.

* * * * *